Aug. 19, 1952 W. E. MAAS 2,607,358
DENTAL FLOSS HOLDER
Filed Dec. 15, 1950
Fig. 1.
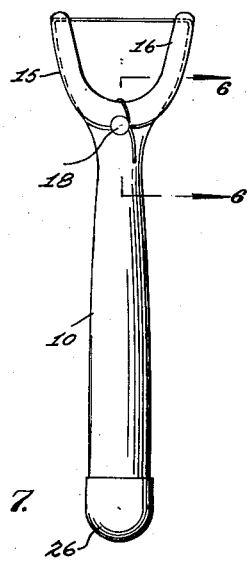
Fig. 2.
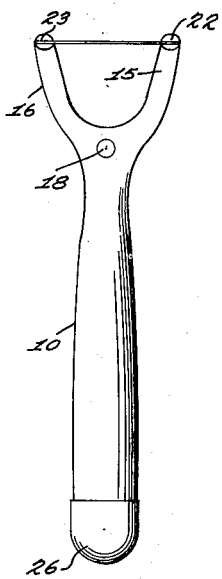
Fig. 3.
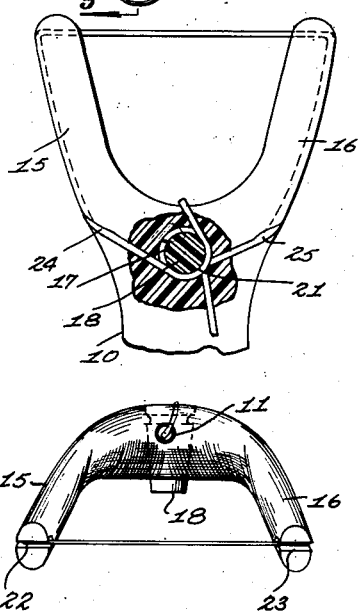
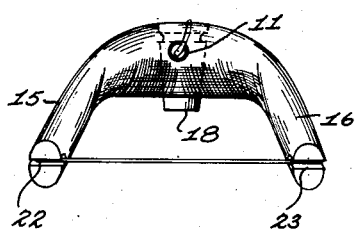
Fig. 4.
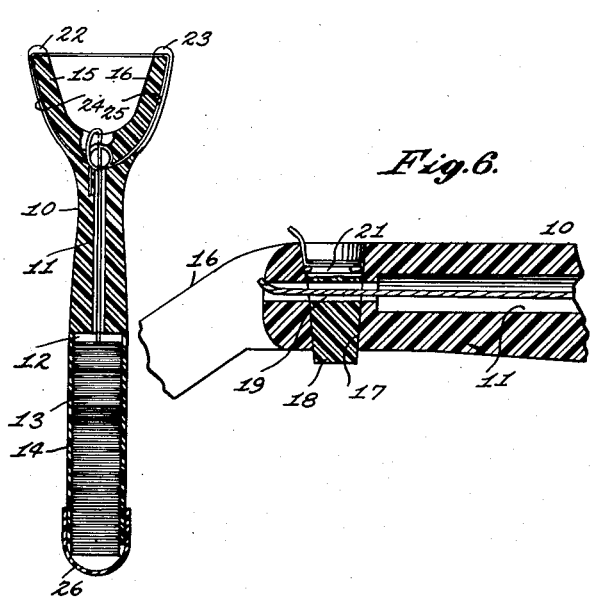
Fig. 5.   Fig. 6.
INVENTOR.
WESLEY E. MAAS
BY
McMorrow, Berman & Davidson
ATTORNEYS Patented Aug. 19, 1952

2,607,358

UNITED STATES PATENT OFFICE 2,607,358

DENTAL FLOSS HOLDER

Wesley E. Maas, Rockford, Ill.

Application December 15, 1950, Serial No. 200,995

1 Claim. (Cl. 132—92)

This invention relates to dental floss holders and applicators and more particularly to a dental floss holder adapted to be held in the hand for applying the dental floss to the teeth.

It is among the objects of the invention to provide an improved dental floss holder and applicator of convenient size to be held in the hand while applying the dental floss to the teeth and having an internal capacity for a full commercial spool of dental floss; which maintains substantially all of the dental floss enclosed except the portion exposed for use; which exposes a straight piece of floss between the distal ends of a pair of legs or tines of a forked formation and provides means for securing the exposed portion of the floss in a taut condition; which includes a tapered floss locking or securing pin apertured for the passage of the floss therethrough to prevent accidental loss of the pin; and which is simple and durable in construction, economical to manufacture, efficient and sanitary in use, and neat and attractive in appearance.

Other objects and advantages will become apparent from a consideration of the following description and the appended claim in conjunction with the accompanying drawing wherein:

Figure 1 is a side elevational view of a dental floss holder and applicator illustrative of the invention;

Figure 2 is a front elevational view of the holder and applicator illustrated in Figure 1;

Figure 3 is a rear elevational view of the holder and applicator;

Figure 4 is a top plan view on a somewhat enlarged scale of the holder and applicator;

Figure 5 is a cross sectional view on the line 5—5 of Figure 1;

Figure 6 is a fragmentary cross sectional view on an enlarged scale on the line 6—6 of Figure 2; and Figure 7 is a fragmentary cross sectional view on an enlarged scale on the line 7—7 of Figure 1.

With continued reference to the drawing, the dental floss holder and applicator includes a main portion which is preferably of one piece construction and formed of a suitable transparent material, such as a synthetic resin plastic. This main portion includes an elongated handle 10 having a bore 11 extending axially therethrough and a counterbore 12 coaxial with the bore 11 and opening to one end of the handle to receive a full commercial spool 13 of dental floss. The counterbore 12 has a diameter only slightly less than the external diameter of the adjacent portion of the handle to constitute the portion of the handle in which the counterbore is provided, a spool receiving sleeve 14. The bore 11 is of a size to conveniently receive an end portion of dental floss threaded therethrough. The main portion also includes a fork formation on the end of the handle remote from that to which the counterbore 12 opens, this fork formation being U-shaped and including a pair of legs 15 and 16 extending outwardly from the corresponding end of the handle in spaced apart and divergent relationship to each other. The center lines of the two legs 15 and 16 are disposed in a plane which intersects at an obtuse angle a plane including the longitudinal center line of the handle and the bore 11 extends through the fork formation between the proximal ends of the two legs 15 and 16.

Adjacent the fork formation the handle 10 is provided with a tapered transverse aperture 17 which extends through the handle and intercepts the bore 11. A tapered pin 18 is received in the tapered aperture 17 and is provided intermediate its length with a transverse aperture 19 which registers with the bore 11 when the pin is inserted fully into the tapered aperture at the proper rotational position. Near its longer end the pin is provided with an annular groove 21 for a purpose to be presently explained.

Each of the legs 15 and 16 is provided in its distal end with a transversely extending notch, as indicated at 22 and 23, the two notches being mutually aligned across the space between the distal ends of the legs. The legs 15 and 16 are also provided in their outer sides with longitudinally extending grooves, as indicated at 24 and 25. The grooves 24 and 25 extend from the outer ends of the notches 22 and 23 respectively along the outer sides of the corresponding legs 15 and 16 toward the distal ends of the legs and extend around the portion of the fork formation joined to the handle toward the head 20 of the pin 18.

In applying dental floss to the holder, a commercial spool or bobbin of dental floss is placed in the counterbore 12 and one end of the dental floss is threaded from the counterbore through the bore 11 and brought out of the end of the bore 11 between the fork legs 15 and 16. In threading the end of the dental floss through the bore 11, it is passed through the transverse aperture 19 in the pin 18 so that the pin will be attached to the handle against accidental loss.

A sufficient length of dental floss is pulled out of the bore 11 to extend around the legs of the fork structure and the end of the dental floss is then carried around the groove 21 at the side of pin 18 remote from the legs 15 and 16 along the groove in one of the fork legs, through the notches at the distal ends of the fork legs and then through the groove in the other fork leg back to the pin. The free end of the dental floss is then pulled to tighten the portion extending between the distal ends of the fork legs and the free end is then wrapped about the pin 18 in the groove 21, one and one half turns to secure the free end of the dental floss firmly to the pin. The pin is then pushed inwardly of the aperture 17 until the groove 21 is within the larger end of the aperture 17 to lock the piece of dental floss extending around the fork legs in a taut condition.

The applicator may then be used to force the piece of dental floss between the distal ends of the fork legs between the teeth of a person using the device to clean out the spaces between the teeth and this piece of dental floss can be washed clean and reversed, if desired. If the piece of dental floss between the distal ends of the fork legs becomes frayed or broken or it is desired to discard this piece of floss, the part of the floss extending from bore 11 is cut off adjacent pin 18 and the portion of dental floss wrapped about the pin 18 is unwound, the pin is loosened by exerting finger pressure on its smaller end and additional floss pulled out of the handle from the spool 13 to extend around the fork and provide a new piece of floss between the distal ends of the fork legs.

A hollow cap 26 telescopically receives the end of the handle 10 to which the counterbore 12 opens to close this end of the counterbore. With this arrangement, all of the dental floss is enclosed except the portion extending immediately around the fork formation of the device and this portion of the dental floss is not ordinarily contacted by the fingers of a person using the device, so that the floss is maintained in a sanitary condition by the holder.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

A dental floss holder and applicator comprising a handle having a bore extending axially therethrough and a counterbore opening at one end thereof for receiving a spool of dental floss, a fork formation on the other end of said handle including a pair of legs projecting outwardly from said other end of the handle in spaced apart relationship to each other, said bore extending through said fork formation between the proximal ends of said legs and each of said legs having a transversely disposed notch in its outer end and a longitudinally extending groove in its outer side, said handle having a tapered aperture extending transversely therethrough adjacent said fork formation and intercepting said bore, and a tapered pin received in said aperture and having a transverse aperture therein registering with said bore and an annular groove therein adjacent the larger end thereof, said bore and the transverse aperture in said pin being adapted to receive an end of dental floss from a spool received in said counterbore, the grooves and notches in said legs being adapted to receive such an end of dental floss to expose a straight length of dental floss between the distal ends of said legs with the floss wound around said pin within said groove and with said pin forced inwardly of said tapered aperture to position said groove within the latter for maintaining the straight length of floss between the distal ends of said legs in a taut condition.

WESLEY E. MAAS.

REFERENCES CITED

The following references are of record in the file of this patent:

UNITED STATES PATENTS

| Number | Name | Date |
| --- | --- | --- |
| 1,417,518 | Henerlau | Mar. 30, 1922 |
| 1,833,671 | Byars | Nov. 24, 1931 |
| 2,182,525 | May | Dec. 5, 1939 |
| 2,354,454 | Geffner | July 25, 1944 |
| 2,384,712 | Turenchallo et al. | Sept. 11, 1945 |
| 2,467,221 | Pastl | Apr. 12, 1949 |